US006760332B1

(12) United States Patent
Vladescu et al.

(10) Patent No.: US 6,760,332 B1
(45) Date of Patent: Jul. 6, 2004

(54) ATM MULTICASTING SYSTEM AND METHOD

(75) Inventors: Virgil Vladescu, Hillsdale, NJ (US); Art Garcia, Tappan, NY (US); Frank Schumeg, Ogdensburg, NJ (US); Vijay Malik, Scotch Plains, NJ (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/325,470

(22) Filed: Jun. 3, 1999

(51) Int. Cl.[7] .............................................. H04L 12/56
(52) U.S. Cl. .................................. 370/395.1; 370/389
(58) Field of Search .............................. 370/395, 389, 370/401, 402, 403, 351, 444, 445, 241, 242, 252, 254, 229, 230, 231, 232, 233, 234, 235, 352, 360, 362, 364, 367, 395.1, 395.51, 395.4, 395.6, 392, 390; 340/825.5, 825.03

(56) References Cited

U.S. PATENT DOCUMENTS

| | | | |
|---|---|---|---|
| 4,339,633 A | 7/1982 | Ahmed | 179/99 M |
| 4,631,641 A | 12/1986 | Brombal et al. | 361/424 |
| 4,893,306 A | 1/1990 | Chao et al. | 370/94.2 |
| 5,012,469 A | 4/1991 | Sardana | 370/95.3 |
| 5,119,370 A * | 6/1992 | Terry | 370/354 |
| 5,130,984 A | 7/1992 | Cisneros | 370/94.1 |
| 5,202,885 A * | 4/1993 | Schrodi et al. | 370/355 |
| 5,278,833 A | 1/1994 | Crisler et al. | 370/95.1 |
| 5,295,140 A | 3/1994 | Crisler et al. | 370/94.1 |
| 5,303,234 A | 4/1994 | Kou | 370/85.2 |
| 5,412,652 A | 5/1995 | Lu | 370/85.12 |
| 5,467,348 A | 11/1995 | Fujii et al. | 370/60.1 |
| 5,515,376 A * | 5/1996 | Murthy et al. | 370/402 |
| 5,537,403 A | 7/1996 | Cloonan et al. | 370/60.1 |
| 5,677,905 A | 10/1997 | Bigham et al. | 370/94.2 |
| 5,689,506 A * | 11/1997 | Chiussi et al. | 370/390 |
| 5,712,851 A | 1/1998 | Nguyen et al. | 370/399 |
| 5,771,234 A | 6/1998 | Wu et al. | 370/396 |
| 5,796,720 A | 8/1998 | Yoshida et al. | 370/245 |
| 5,805,568 A | 9/1998 | Shinbashi | 370/223 |
| 5,838,924 A | 11/1998 | Anderson et al. | 395/200.69 |
| 5,841,771 A | 11/1998 | Irwin et al. | 370/360 |
| 5,867,502 A | 2/1999 | Chang | 370/477 |
| 5,920,412 A | 7/1999 | Chang | 359/128 |
| 5,982,776 A | 11/1999 | Manning et al. | 370/414 |
| 6,052,376 A * | 4/2000 | Wills | 370/235 |
| 6,067,301 A | 5/2000 | Aatresh | 370/418 |
| 6,144,669 A | 11/2000 | Williams et al. | 370/401 |

FOREIGN PATENT DOCUMENTS

| | | | |
|---|---|---|---|
| EP | 0 509 648 A1 | 10/1992 | H04L/12/56 |
| EP | 0 680 235 A1 | 11/1995 | H04Q/11/04 |
| EP | 0 700 186 A1 | 3/1996 | H04L/12/56 |
| EP | 0 817 439 A2 | 1/1998 | |
| EP | 0 818 940 A2 | 1/1998 | H04Q/11/04 |
| EP | 0 868 058 A1 | 9/1998 | H04L/12/56 |
| EP | 0 901 307 A2 | 3/1999 | H04Q/11/04 |
| WO | WO 99/09689 | 2/1999 | |

OTHER PUBLICATIONS

"General Aspects of Digital Transmission Systems," XP–002083788, ITU–T Recommendation G.708, *ITU–T Telecommunication Standardization Section of ITU*, Mar., 1993, 19 pages.

(List continued on next page.)

*Primary Examiner*—Dang Ton
(74) *Attorney, Agent, or Firm*—Baker Botts L.L.P.

(57) ABSTRACT

In an ATM communications system, a cell entering a switch fabric input port is routed to its destination output port and to a predetermined dedicated second output port. The second output port is connected by a feedback connection to a predetermined dedicated second input port. The cell can then be either switched to the same destination output port or switched to both the same destination output port and the predetermined dedicated second output port, thereby providing the ability to execute a logical multicast with any number of leaves to the destination output port.

20 Claims, 5 Drawing Sheets

OTHER PUBLICATIONS

International Search Report in International Application No. PCT/US00/15331, dated Aug. 31, 2000, 6 pages.

Wu, et al., "A Broadband Virtual Path SONET/ATM Self-Healing Ring Architecture and Its Economic Feasibility Study," *IEEE GlobalTelecommunications Conference*, Dec. 6–9, 1992, 8 pages.

Tsong–Ho Wu, "Cost–Effective Network Evolution, A three–phase path from todays SONET/STM ring transport to a SONET/ATM VP ring transport could facilitate the network evolution for broadband service," *IEEE Communications Magazine*, Sep. 1993, 10 pages.

M. Huterer, "ATM on SDH," *Alcatel Telecommunications Review*, 1st Quarter, 1997, 9 pages.

PCT Written Opinion in International Application No. PCT/US00/15426, dated Jun. 26, 2001, 5 pages.

Tai H. Noh, ATM Scenarios for SDH/SONET Networks, XP–000750438, *Bell Labs Technical Journal*, Jan.–Mar. 1998, 13 pages.

International Search Report in International Application No. PCT/US 00/15426, dated Sep. 21, 2000, 7 pages.

International Search Report in International Application No. PCT/US 00/15425, dated Sep. 7, 2000, 6 pages.

PCT International Search Report in International Application No. PCT/US00/15337, dated Aug. 24, 2000, 7 pages.

K. Sriram, "Methodologies for bandwidth allocation, transmission scheduling, and congestion avoidance in broadband ATM networks," *Computer Networks and ISDN Systems*, vol. 26, No. 1, Sep., 1993, 17 pages.

Fabrice Guillemin, et al., "Some Traffic Aspects in Virtual Private Networks over ATM," XP–000702583, Source Unknown, Apr., 1996, 12 pages.

Noriharu Miyaho, et al., "Integrated Switching Architecture and Its Traffic Handling Capacity in Data Communication Networks," XP 000692355, *IEEE Trans Commun.*, vol. E79–B, No. 12, Dec., 1996, 13 pages.

International Search Report in International Application No. PCT/US 00/15131, dated Sep. 7, 2000, 6 pages.

PCT Written Opinion in International Application No. PCT/US00/15131, dated Nov. 8, 2001, 5 pages.

Kurimoto, et al., "An Expandable Multicast ATM Switch Based on Copy Trunk with New Delay Control and Cell Spacing Functions, XP 000628644," *IEICE Trans. Commun.*, vol. E79B, No. 8, Aug., 1996, 7 pages.

Subramaniam, et al., Multicasting in ATM networks using MINs[1], *Computer Communications 19*, 1996, 11 pages.

International Search Report in International Application No. PCT/US 00/15336, dated Sep. 4, 2000, 7 pages.

Photography of Northern Telecom Card, Sep. 21, 2000.

Held, G., *Understanding Data Communications*, Fifth Edition, Sams Publishing. ISBN No. 0–672–30934–3, Chapter 14, pp. 419–431, 1996.

McCloghrie, K., et al., "Management Information Base for Network Management of TCP/IP–based internets: MIB–II," SNMP Working Group, Mar., 1991.

"Draft New Recommendation 1.630 (ATM Protection Switching)," ITU Telecommunication Standardization Sector, COM 13–41–E, Sep., 1998.

Geérin, R., et al., "Equivalent Capacity and its Application to Bandwidth Allocation in High–Speed Networks," IEEE Journal on Selected Areas in Communications, vol. 9, No. 7, pp. 968–981, Sep., 1991.

Gün, L., et al., "Bandwidth Management and Congestion Control Framework of the Broadband Network Architecture," Computer Networks and ISDN Systems 26, Elsevier Science Publishers B.V., North–Holland, pp. 61–78, 1993.

"S/DMS TransportNode 'OC–3 Express'—Cost–Effective SONET Transport for Low–Capacity Applications", Northern Telecom Marketing Publications, Issue 1, pp. 1–31, Sep. 27, 1996.

*Universal Serial Bus Specification Revision 1.1*, Compaq Computer Corporation, Intel Corporation, Microsoft Corporation, NEC Corporation, Sep. 23, 1998.

"MMC Products" http://www.mc–net.com/top–roducts/productdescriptions.html, Printed Jul. 22, 1999.

"MMC Network's Products: AnyFlow 5400," http://www.mmcnet.com/Solutions/anyflow5400.asp, Printed Feb. 7, 2000.

McDysan, David E., et al., *ATM Theory and Application*. McGraw–Hill, Inc. ISBN 0–07–060362–6, pp. 365–385, 1994.

Erdengiz, Ali, "ATM Usage Policing and Traffic Shaping," Communications System Design (Jan. 1997).

Dobrowski, George et al., *ATM User–Network Interface Specification, Version 3.1*, The ATM Forum, Sep., 1994.

Cerent 454™ High Speed SONET/SDH Transport System, ALTS trade show, Las Vegas, Nevada on or about Dec., 1998.

"FLM 150 ADM LAN Extension Product Design Specification," Revision 1.1, Internal Design Specification for Product, sheets 6/353–10/353 and 72/353–75/353, Product publicly released on or about Dec., 1998.

"Product Design Specification (PDS) for FLASH–192, Release 1," Internal Design Specificiation for Product, pp. 1/916; 4–12/9161 315–320/916, Product publicly released on or about Mar., 1999.

"InterNetworking Systems; AnyMedia® Access Products; AnyMedia Access System," http://lucent.com/ins/products/anymedia.html, Printed Aug. 10, 2000.

"AnyMedia® Access System," Lucent Technologies, Inc. Marketing Communications, Sep. 1999.

"The AnyMedia™ Access System Anything's Possible," Lucent Technologies, Inc. Marketing Communications, 1997.

"MMC Network's Products: AnyFlow 5500," http://www.mmcnet.com/Solutions/anyflow5500.asp, Printed Feb. 7, 2000.

"AnyFlow 5400 Product Overview," MMC Networks, Undated.

"AnyFlow 5500 Product Overview," MMC Networks, Undated.

SwitchStAR™ ATM Cell Based 8 X 8 Non–Blocking Single Chip Switching Memory, Preliminary IDT77V400, Commercial Temperature Range, Integrated Device Technology, Inc., pp. 1–23, May. 1998.

SwitchStAR™ ATM Cell Based Non–Blocking Single Chip Switch Controller, Preliminary IDT77V500, Commercial Temperature Range, Integrated Device Technology, Inc., pp. 1–14, May, 1998.

Giroux, Natalie et al., *Traffic Management Specification, Version 4.0*, af–tm–0056.000, The ATM Forum, Apr., 1996.

*M4 Interface Requirements and Logical MIB*, af–nm–0020.000, The ATM Forum, Oct., 1994.

\* cited by examiner

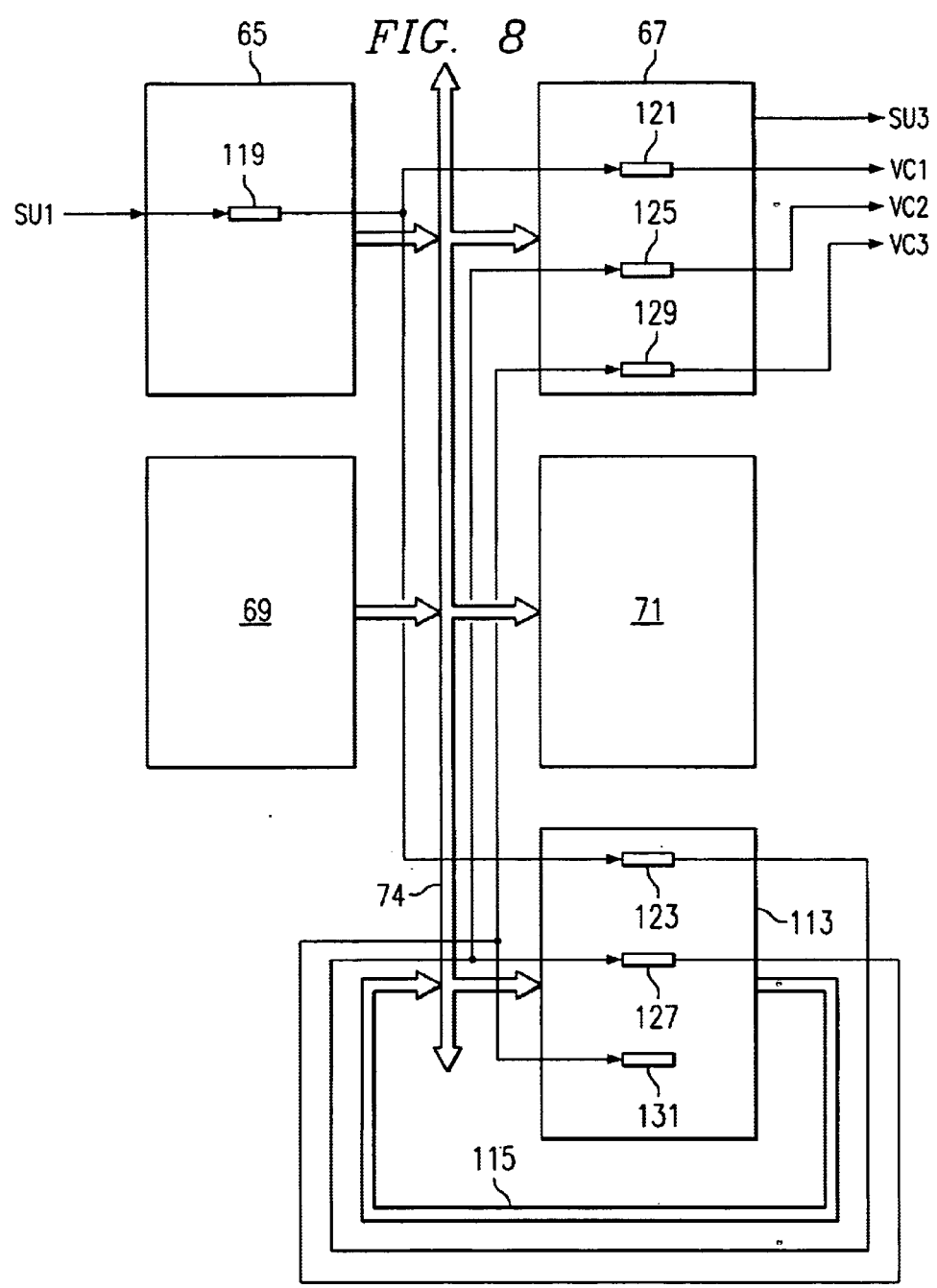

US 6,760,332 B1

ATM MULTICASTING SYSTEM AND METHOD

TECHNICAL FIELD OF INVENTION

The present invention relates generally to the field of asynchronous transfer mode (ATM) communications and, more particularly, to logical multicasting in an ATM switch fabric.

BACKGROUND OF THE INVENTION

In an ATM communications system it is often desirable to establish a point-to-multipoint virtual connection (VC), which is known as "multicasting." For example, a caller at a location in New York may wish to set up a conference call with three other participants, each of whom are in Los Angeles. Rather than establishing three separate cross-country VCs, it is desirable, from a bandwidth perspective, to have a single cross-country VC for the call which is then "multicast" to each participant from a switch point which is closer to the recipients' respective locations.

A multicast may be either spatial or logical. A spatial multicast occurs when the recipients are located at different physical switch output ports from one another. A logical multicast occurs when the recipients are located at the same physical output port, for example, on a LAN. So, in our example, if the three recipients are located at several unconnected offices scattered throughout Los Angeles, the multicast would be spatial. If, on the other hand, the recipients are located at a single company with a LAN, the multicast would be logical, since the call would be directed to all three recipients from a single switch output port at the local telephone company central office which serves the LAN.

Presently, ATM switches typically have a spatial multicasting capability, and switches which perform both spatial and logical multicasting are available. MMC Networks, Inc., for example, manufactures and sells a switch with full multicasting capabilities. Such switches however, have a number of disadvantages. Fist, a significant amount of available memory in the switch lookup tables must be dedicated to logical multicasting. In addition, logically multicasting switches typically are larger and use significantly more power than switches that do not have logical multicasting capability. They are also much more expensive. As those skilled in the art are well aware, space, power and cost constraints are important considerations in the design of any communications system.

SUMMARY OF THE INVENTION

In accordance with the present invention, an ATM cell entering a switch fabric input port is routed to its destination output port and to a predetermined dedicated second output port. The second output port is connected by a feedback connection to a predetermined dedicated second input port. The incoming cell can then be either switched to the same destination output port or switched to both the same destination output port and the predetermined dedicated second output port, thereby providing the ability to execute a logical multicast with any number of leaves to the destination output port.

It is therefore an object of the present invention to provide a logical multicasting capability using the smaller, cheaper and less power-consuming switches which do not have a built-in logical multicasting function. It is a further object to do so without adding significant size, cost or power consumption to the switch fabric.

For a better understanding of the present invention, together with other and further objects, reference is made to the following description, taken in conjunction with the accompanying drawings and its scope will be pointed out in the appended claims.

BRIEF DESCRIPTION OF THE DRAWINGS

FIG. 8 is an illustration of a sample logical multicast in accordance with the present invention using the switch configuration of FIG. 7.

DETAILED DESCRIPTION OF THE INVENTION

Figure 1:
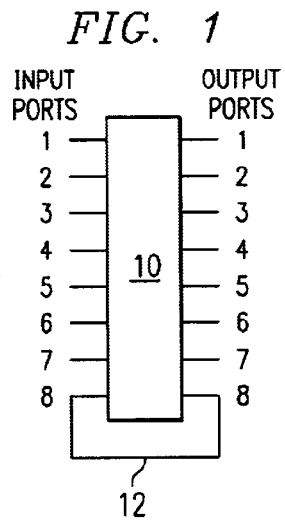
FIG. 1 depicts an exemplary switch configuration in accordance with the present invention.

FIG. 1 depicts an exemplary switch configuration in accordance with the present invention. Switch 10 is an 8×8 ATM switch without a built-in logical multicasting capability. Such a switch is available from, among other vendors, Integrated Device Technologies, Inc. The switch is configured according to the present invention to provide logical multicasting. A feedback connection 12 is provided from output port 8 to input port 8, each of which is dedicated to the logical multicasting function. The use of the number 8 ports is arbitrary; any input/output pair of ports will suffice.

When logical multicasting to a single output port, for example output port 1, is desired, the lookup table is set up to produce a spatial multicast to the desired output port, in this example port 1, and to the dedicated output port, in this example port 8. The information is then routed back via the feedback connection 12 into the switch at input port 8. If only two virtual connections are desired for the multicast, the cell is then routed only to output port 1. If one or more additional virtual connections are desired, then a port 1/port 8 spatial multicast is executed again, with the ATM cell being sent on a second virtual connection out of port 1 and again out of port 8. The feedback/spatial multicast routine is performed as many times as necessary to achieve the desired number of virtual connections out of port 1.

Figure 2:
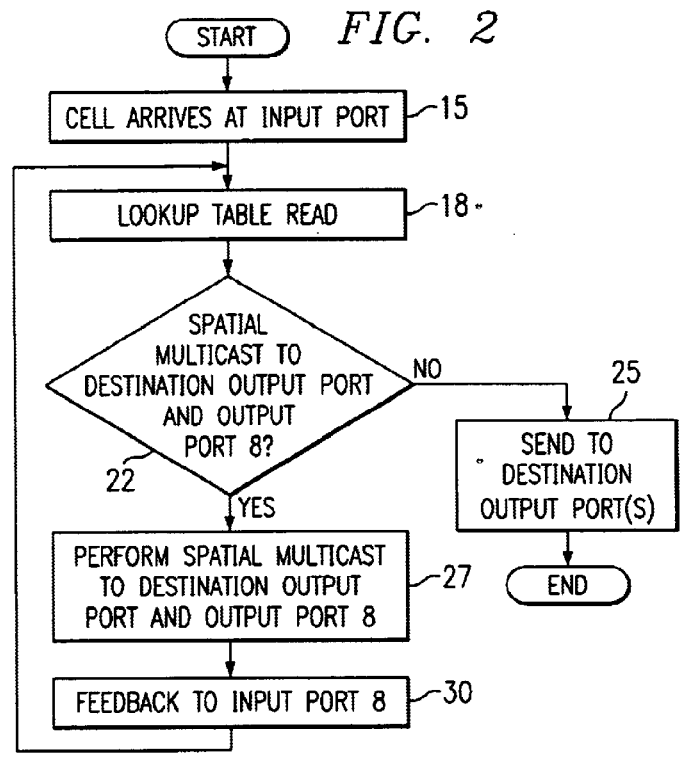
FIG. 2 is a flow diagram illustrating a logical multicast operation in accordance with the embodiment of the present invention depicted in FIG. 1.

FIG. 2 is a flow diagram for the above-described routine performed at the switch 10 to obtain a logical multicast. At box 15, a cell arrives at an input port. At box 18, the VPI/VCI information and the corresponding entry in the switch lookup table are read. Based upon the lookup table information, at box 22 it is determined whether a spatial multicast to port 8 and any other output port is to be performed, i.e., a logical multicast is desired for the payload information. If not, then, at box 25, the cell is sent to the desired output port or ports, and the switch does nothing further with the cell. If, however, the lookup table information read at box 18 indicates that a spatial multicast to output port 8 and another destination output port is desired, at box 27 the spatial multicast is performed. At box 30, the cell is fed back into input port 8 from output port 8, and the flow diagram then returns to box 18 where the lookup table is again consulted to see if additional VCs to the same output port are set up for the cell.

Figure 3:
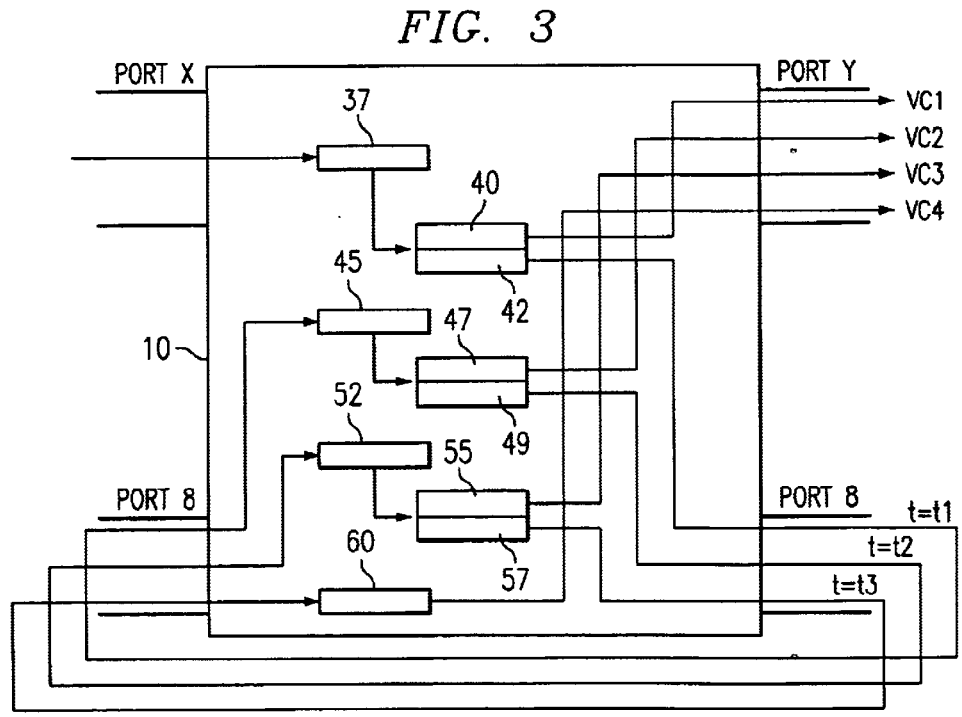
FIG. 3 is an illustration of a sample logical multicast in accordance with the present invention using the switch configuration of FIG. 1.

FIG. 3 illustrates a sample logical multicast in accordance with the present invention using the switch configuration of FIG. 1 wherein an 8×8 switch 10 without a built-in logical multicasting capability is configured with a feedback path from output port 8 to input port 8. In this example, a logical multicast from a sender at input port X to four recipients at output port Y is performed. A cell enters port X of switch 10. Based upon the VPI/VCI information contained in the cell header, lookup table entry 37 in the lookup table of the switch points to two other lookup table entries 40, 42, thereby indicating that a spatial multicast is to be performed. Entries 40, 42, in turn, route the cell to output port Y on virtual connection VC1 and to output port 8 at time t=t1. As described above, output port 8 has a feedback connection to input port 8. Based upon the VPI/VCI information in the header of the cell entering input port 8, lookup table entry 45 again points to two other lookup table entries 47, 49 which carry out a spatial multicast to output port Y on virtual connection VC2 and to output port 8 at time t=t2. The cell entering input port 8 from the feedback connection is again spatially multicast. Lookup table entry 52 points to entries 55, 57 which route the cell information to output port Y on virtual connection VC3 and to output port 8 at time t=t3. Finally, the cell entering input port 8 from the feedback connection is directed to output port Y on virtual connection VC4 by lookup table entry 60. The end result is that the same payload information of the cell which entered input port X is transmitted on four virtual channels out of the same output port.

Figure 4:
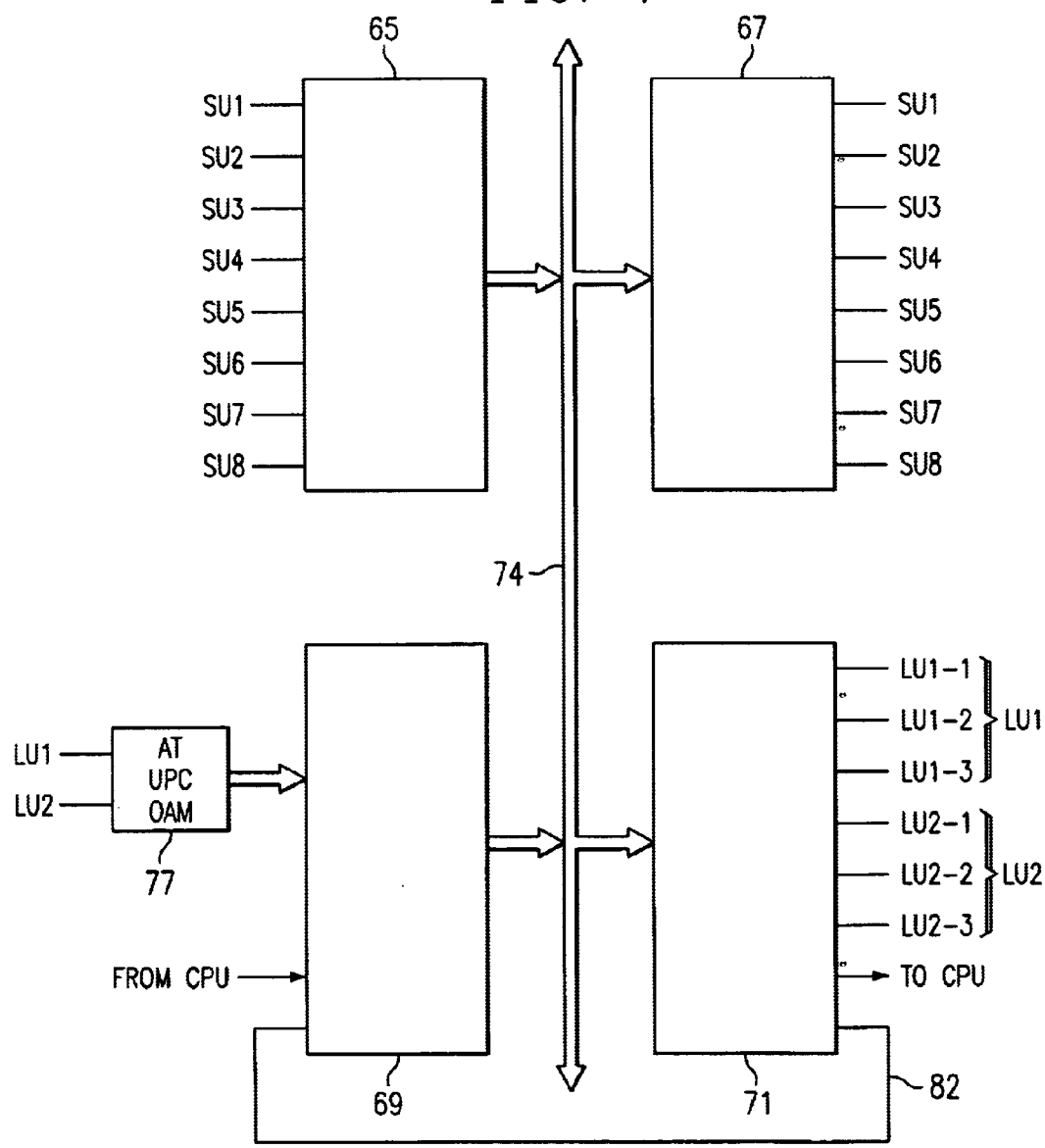
FIG. 4 depicts a second exemplary switch configuration in accordance with the present invention.

FIG. 4 depicts a second exemplary switch configuration in accordance with the present invention. In this configuration, four 8×8 switches 65, 67, 69, 71 comprise the switch fabric of a network element performing switching among eight service units (SUs) and two line units (LUs). In the unidirectional representation of the bidirectional system depicted in FIG. 4, the output sides of two of the switches 65, 69 are connected to the input sides of the other two switches 67, 71 via cell bus 74. The input side of switch 65 and the output side of switch 67 are connected to the eight SUs, while switches 69 and 71 are connected to the two LUs, as well as a CPU which aids in the switching function. Box 77 depicts the address translation (AT), usage parameter control (UPC) and operations, administration and management (OAM) functions which may be carried out by a commercially available chip such as one manufactured by PMC/Sierra under the trade name Atlas. In accordance with the invention, a feedback connection 82 is provided from an output port of switch 71 to an input port of switch 69.

Figure 5:
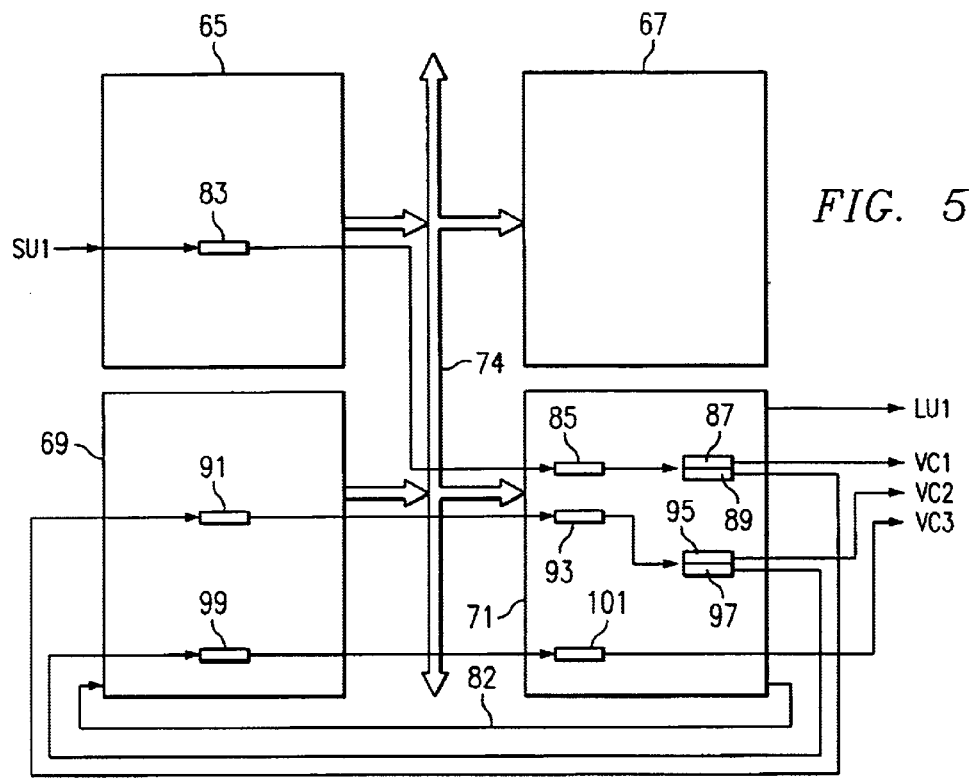
FIG. 5 is an illustration of a sample logical multicast in accordance with the present invention using the switch configuration of FIG. 4.

FIG. 5 is an illustration of a sample logical multicast in accordance with the present invention using the switch configuration of FIG. 4. In this example, a point-to-multipoint connection with three leaves to the same LU1 output port of switch 71 is established. A cell to be multicast enters the SU1 input port of switch 65 where VC lookup table entry 83 broadcasts the cell onto the cell bus 74. Each switch has a different VPI associated with it, and, based upon the VPI information in the header, the cell is recognized and received at switch 71 where, based upon the VCI information in the header, VC lookup table entry 85 effects a spatial multicast, pointing to entries 87, 89. Entry 87 routes the cell out the LU1 port on VC1, and entry 89 routes the cell to output port 8 of switch 71, through the feedback connection to the designated input port of switch 69. Entry 91 of the lookup table in switch 69 sends the cell through the switch onto the cell bus 74. Again, based upon the VPI information, the cell is recognized and received at switch 71, and based upon the VCI information, entry 93 of the VC lookup table points to entries 95, 97. Entry 95 routes the cell out the LU1 port on VC2, and entry 97 routes the cell to output port 8 of switch 71, through the feedback connection to the designated input port of switch 69. The cell is then routed through switch 69 by VC entry 99 to switch 71 and out the LU1 port on VC3 by VC entry 101.

Figure 6:
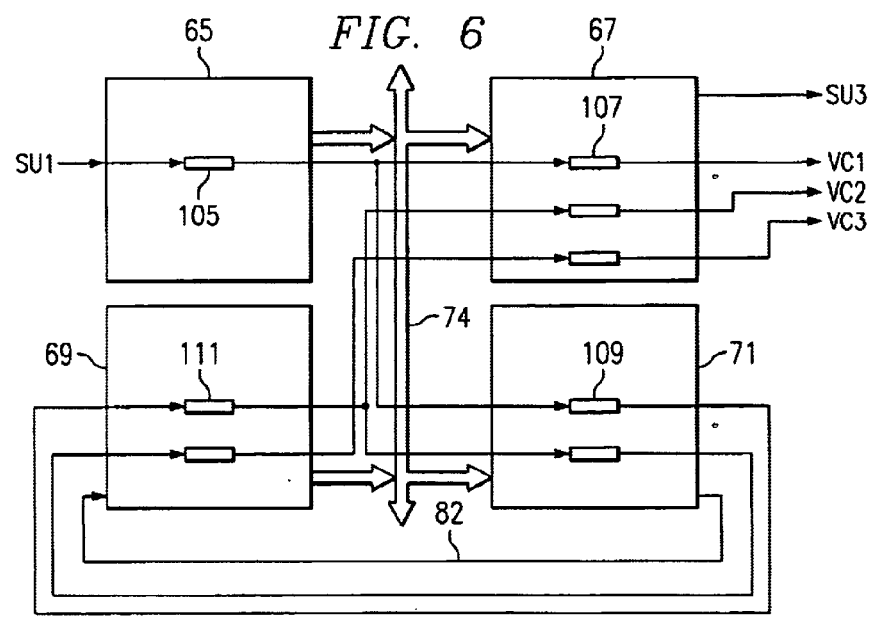
FIG. 6 is an illustration of a second sample logical multicast in accordance with the present invention using the switch configuration of FIG. 4.

FIG. 6 is an illustration of a second sample logical multicast in accordance with the present invention using the switch configuration of FIG. 4. In this example, a point-to-multipoint connection with three leaves to the same SU3 output port of switch 67 is established. Since the desired output port is not on the switch having the output port dedicated to logical multicasting, in this case switch 71, it will be seen that, unlike the previous examples, spatial multicasting within any of the four individual switches which comprise the switch fabric is not necessary to accomplish the desired logical multicast.

The cell to be multicast enters the SU1 input port of switch 65 and is broadcast onto the cell bus 74 by VC lookup table entry 105. Each of switches 67, 71 has a lookup table entry for the cell based upon the VPI/VCI header information. Entry 107 in switch 67 sends the cell to output port SU3 on VC1. Entry 109 in switch 71 sends the cell along the feedback connection 82 to the dedicated input port on switch 69. Entry 111 in switch 69, in turn, broadcasts the cell onto the cell bus 74, and the routine is repeated until the cell is sent on three VCs from the SU3 output port of switch 67.

As demonstrated in the previous example, a primary advantage of eliminating the need for spatial multicasting by logically multicasting out of a switch which does not have the dedicated feedback path 82 of the invention is that the number of necessary VC lookup table entries is reduced. In the example discussed in connection with FIG. 5, ten entries were necessary to obtain a point to multipoint connection with three leaves. In the example discussed in connection with FIG. 6, however, only eight entries were necessary to obtain the same result, i.e., three leaves from a single output port, where the desired output port was not on the same switch having the dedicated feedback output port. The number n of necessary lookup table entries B may be expressed as B=n+3(n−1)+1 for logical multicasts out of switch 71 where spatial multicasting is necessary, as in FIG. 5, and as B=n+2(n−1)+1 for logical multicasts out of switch 67 where spatial multicasting is not necessary, as in FIG. 6.

Figure 7:
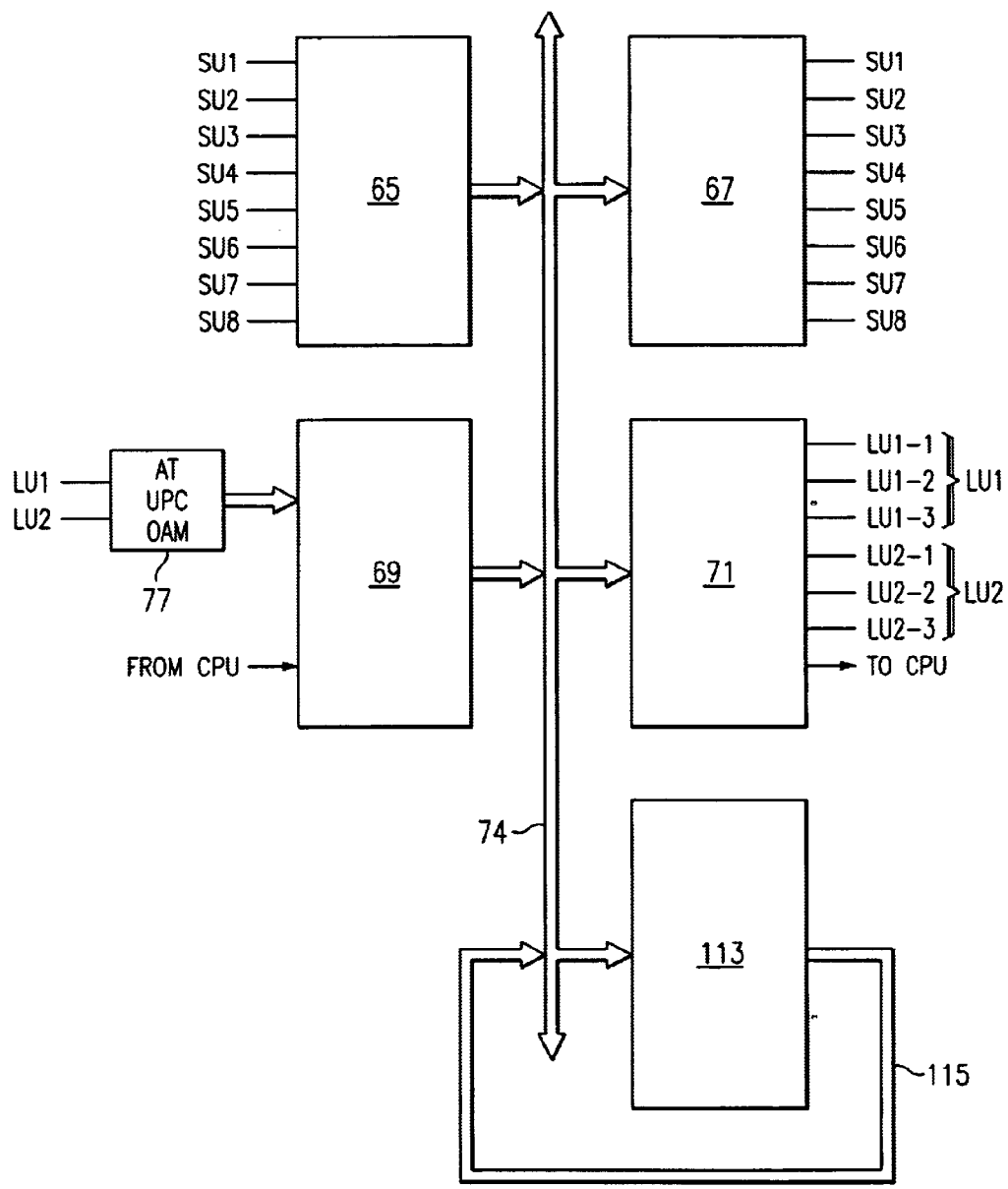
FIG. 7 depicts a third exemplary switch configuration in accordance with the present invention.

A further reduction in the memory required by the four switches comprising the switch fabric may be realized by employing an additional switch dedicated to the logical multicasting function. FIG. 7 depicts a third exemplary switch configuration in accordance with the present invention which employs an additional switch 113 dedicated to the logical multicasting function to ensure that spatial multicasting within any of the four primary switches 65, 67, 69, 71, is not required for any logical multicasting operations, thereby conserving memory in the four primary switches. Switch 113 employs a feedback cell bus 115 from the outputs to the inputs of the switch. The cell bus 115 feeds into the main cell bus 74, and provides a significant speed advantage over the use of a single pair of ports.

FIG. 8 is an illustration of a sample logical multicast in accordance with the present invention using the switch configuration of FIG. 7. In this example, a cell coming in to input port SU1 on switch 65 is multicast three times to the same output port SU3 of switch 67. The incoming cell is directed onto the cell bus 74 by lookup table entry 119 in switch 65. Each of chips 67, 113 have lookup table entries for the cell. Entry 121 in chip 67 directs the cell out of the destination output port SU3 on VC1. Entry 123 in chip 113 directs the cell out of the chip and onto the feedback cell bus 115 which broadcasts the cell onto the main cell bus 74. Again, each of chips 67, 113 have lookup table entries for the cell. Entry 125 in chip 67 directs the cell out of the destination output port SU3 on VC2. Entry 127 in chip 113 directs the cell onto cell bus 115 which broadcasts the cell onto the main cell bus 74. The cell is then accepted at each of chips 67, 113 for a third time. Lookup table entry 129 in chip 67 sends the cell out of the destination output port SU3 on VC3, while lookup table entry 131 in chip 113 stops sending the cell since the triple multicast to the designated output port on chip 67 has been accomplished.

While this invention has been described with reference to several illustrative examples and embodiments, they should not be interpreted as limiting the scope or spirit of the invention which uses feedback to provide a logical multicasting function in an ATM switch fabric. In actual practice many modifications may be made by those of ordinary skill in the art without deviating from the scope of the invention as expressed in the appended claims.

We claim:

1. In an asynchronous transfer mode communications system, a method for logically multicasting cells to a first predetermined output port of a switch comprising the steps of:
   receiving a cell at a first input port of the switch, the cell including information identifying a first and at least one additional virtual circuit routed through a first predetermined output port of the switch;
   routing the cell to the first predetermined output port based on the identified first virtual circuit;
   repeatedly feeding the cell back from a second predetermined output port to a predetermined second input port of the switch a number of times, the number of times based on the number of the at least one additional virtual circuit; and
   routing the cell through the first predetermined output port after each time the cell is feed back from the second predetermined output port to the predetermined second input port of the switch.

2. The method of claim 1, wherein, if only one more output of the cell to the first predetermined output is desired, the cell is routed to the first predetermined output port.

3. In an asynchronous transfer mode communications system, a method for logically multicasting cells to a predetermined output port of a switch fabric comprising at least two input switches and at least two output switches, the output ports of the input switches and the input ports of the output switches being connected by a cell bus, the method comprising the steps of:
   receiving a cell at a first input port of a first input switch, the cell including information identifying a first and at least one additional virtual circuit routed through a first predetermined output port of a first or second output switch;
   sending the cell onto the cell bus;
   determining whether a predetermined output port is on the first or the second output switch;
   receiving the cell from the cell bus at the first output switch;
   if the predetermined output port is on said first output switch, routing the cell to the first predetermined output port of the first output switch based on the identified first virtual circuit;
   if the predetermined output port is on the second output switch, routing the cell to the first predetermined output port of the second switch based on the identified first virtual circuit
   repeatedly feeding the cell back from a predetermined second output port on the first output switch to a predetermined second input port on one of the input switches a number of times, the number of times based on the number of the at least one additional virtual circuits; and
   routing the cell through the predetermined output port after each time the cell is feed back from the predetermined second output port on the first switch to the predetermined second input port on the one of the input switches.

4. In an asynchronous transfer mode communications system, a method for logically multicasting cells to a predetermined output port of a switch fabric comprising at least two input switches, at least two output switches and a switch dedicated to the logical multicasting, the output ports of the input switches and the input ports of the output switches being connected by a cell bus to each other and to both the input and output ports of the switch dedicated to logical multicasting, the method comprising the steps of:
   receiving a cell at a first input port of a first input switch, the cell including information identifying a first and at least one additional virtual circuit routed through a first predetermined output port of a first output switch;
   sending the cell onto the cell bus;
   receiving the cell from the cell bus at a first output switch on which is located the predetermined output port;
   sending the cell out of the predetermined output port based on the first virtual circuit;
   repeatedly feeding the cell back from the output of the switch dedicated to logical multicasting to the cell bus a number of times, the number of times based on the number of the at least one additional virtual circuit; and
   sending the cell out the predetermined output port after each time the cell is feed back from the output of the switch dedicated to logical multicasting to the cell bus.

5. An ATM switch fabric for routing cells, each cell including information identifying a first and at least one additional virtual circuit, comprising:
   at least one switch with memory for a switching lookup table;
   first and second input ports;
   first and second output ports; and
   a feedback connection from the first output port to the first input port, wherein a cell entering the second input port and routed out of the first and second output ports will be repeatedly routed via the feedback connection into the first input port based on a number of times wherein the number of times is based on a number of the at least one additional virtual circuit of a cell and can then be routed from the first input port to the second output port after each time the cell is feedback to the first input port thereby accomplishing a logical multicast of the cell to the second output port.

6. The switch fabric of claim 5, wherein the at least one switch comprises four switches, the output ports of two of the switches being connected to the input ports of two other switches by a cell bus.

7. The switch fabric of claim 5 wherein the at least one switch is an 8×8 switch.

8. The switch fabric of claim 6 wherein the four switches are 8×8 switches.

9. An ATM switch fabric for routing cells comprising five switches having input ports and output ports, the input ports of first two of the switches being connected to the output ports of second two of the switches by a cell bus and the fifth switch having its input ports and output ports connected to the cell bus such that a cell may be repeatedly feedback to the cell bus based on a number of times, wherein the number of times is based on the at least one additional virtual circuit, and the cell is routed out the ATM switch fabric after each time the cell is feed back to the cell bus.

10. The ATM switch fabric of claim 8 wherein the switches are 8×8 switches.

11. The method of claim 1, wherein the step of determining comprises:
   determining header information for the call;
   retrieving a table relating the header information to a plurality of virtual channels for the cell; and
   determining if more than one more output of the cell is required based on the header information.

12. A method of multicasting cells, comprising:
   receiving a cell at one of a plurality of input ports, the cell including information identifying a first and at least one additional virtual circuit routed through a first predetermined output port of a first or second output switch;
   communicating the cell to a first output port based on the first identified virtual circuit;
   repeatedly feeding the cell back from the second output port to one of the input ports based on a number of times, wherein the number of times is based on the number of the at least one additional virtual circuit so that the cell is repeatedly communicated to the first output port based on the number of times the cell is feed back from the second output port to one of the input ports.

13. The method of claim 12, wherein the input ports and the output ports are on a single switch.

14. The method of claim 12, wherein:
   the input ports are distributed among a plurality of input switches;
   the first output port is on a first switch;
   the second output port is on a second switch; and
   the input switches, the first switch and the second switch are coupled by a cell bus.

15. The method of claim 12, wherein:
   the second output port comprises a logical multicasting port dedicated to logical multicasting; and
   the step of feeding the cell back comprises communicating the call to a particular input port operable to communicate the cell to the first output port and the logical multicasting port.

16. The method of claim 12, wherein the step of feeding back comprises:
   determining a virtual channel on the first output port that has not received the cell; and
   communicating the cell to one of the input ports such that the cell is communicated to the virtual channel of the first output port.

17. The method of claim 12, further comprising:
   determining a required number of times to communicate the call to the first output port; and
   repeating the method until the cell is communicated to the first output port the required number of times.

18. A method of multicasting cells, comprising:
   receiving a cell at an input port of an input switch, the input switch coupled to a cell bus, the cell bus coupled to a first switch having an output port and a second switch dedicated to logical multicasting, the cell including information identifying a first and at least one additional virtual circuit routed through a first predetermined output port of a first or second output switch;
   communicating the cell to the second switch and to the output port of the first switch;
   receiving the cell at the second switch; and
   repeatedly feeding the cell back from the second switch to the output port of the first switch using the cell bus based on a number of times, the number of times based on the number of the at least one additional virtual circuit.

19. The method of claim 18, wherein the step of feeding the cell back comprises:
   determining a virtual channel of the output port that has not received the cell; and
   communicating the cell to the virtual channel.

20. The method of claim 18, further comprising:
   determining a required number of times to communicate the cell to the output port; and
   repeating the step of feeding the cell back until the cell has been communicated to the output port the required number of times.

* * * * *

UNITED STATES PATENT AND TRADEMARK OFFICE
CERTIFICATE OF CORRECTION

PATENT NO. : 6,760,332 B1
DATED : July 6, 2004
INVENTOR(S) : Virgil Vladescu et al.

It is certified that error appears in the above-identified patent and that said Letters Patent is hereby corrected as shown below:

Column 1,
Line 40, after "disadvantages.", delete "Fist", and insert -- First --.

Column 5,
Line 45, after "is", delete "feed", and insert -- fed --.

Column 6,
Lines 16 and 43, after "is", delete "feed", and insert -- fed --.
Line 60, after "is", delete "feedback", and insert -- fed back --.

Column 7,
Line 10, after "repeatedly", delete "feedback", and insert -- fed back --.
Lines 14 and 36, after "is", delete "feed", and insert -- fed --.
Line 19, after "the", delete "call", and insert -- cell --.

Column 8,
Line 5, after "the", delete "call", and insert -- cell --.
Line 17, after the first "the", delete "call", and insert -- cell --.

Signed and Sealed this

Twenty-fifth Day of January, 2005

JON W. DUDAS
*Director of the United States Patent and Trademark Office*